United States Patent [19]

Jin

[11] Patent Number: 5,170,959
[45] Date of Patent: Dec. 15, 1992

[54] REEL DISK DEVICE FOR A SMALL DECK

[75] Inventor: Hong-jae Jin, Seoul, Rep. of Korea

[73] Assignee: Goldstar Co., Ltd., Rep. of Korea

[21] Appl. No.: 631,624

[22] Filed: Dec. 21, 1990

[30] Foreign Application Priority Data

Jun. 18, 1989 [KR] Rep. of Korea .................. 90-8573
Jun. 29, 1989 [KR] Rep. of Korea .................. 89-9124

[51] Int. Cl.⁵ ................... B65H 18/02; B65H 16/02
[52] U.S. Cl. ................................ 242/68.3; 242/68.1
[58] Field of Search ................. 242/68.3, 199, 200, 242/201, 68.1, 68.2; 360/96.3

[56] References Cited

U.S. PATENT DOCUMENTS 3,791,604  2/1974  Meermans ................. 242/68.3
4,747,556  5/1988  Tanaka et al. .............. 242/68.3
4,887,775 12/1989  Kanaguchi et al. ........... 242/199

FOREIGN PATENT DOCUMENTS 61-68760  4/1986  Japan ...................... 242/68.3

Primary Examiner—Daniel P. Stodola
Assistant Examiner—John Q. Nguyen
Attorney, Agent, or Firm—Anthony J. Casella; Gerald E. Hespos

[57] ABSTRACT

A reel disk for a small cassette is simplified in cap reel structure therein so that number of parts thereof are reduced and assembly work becomes easy. The simplified cap reel is of elastic body and has elastic locking pieces that are united as one body with said cap reel and is jointed with a hub of a cassette tape for delivery of rotation force.

3 Claims, 7 Drawing Sheets

REEL DISK DEVICE FOR A SMALL DECK

BACKGROUND OF THE INVENTION

The present invention relates to a reel disk for a small deck, and more particularly to a reel disk device that is improved in cap reel structure therein so that the number of parts thereof are reduced, assembly work becomes easy and cost is reduced.

In conventional reels, as shown in FIGS. 1 and 2, a coil spring 3 is inserted over a boss 6 that is projected vertically with hexagonal shape at the center of the reel 4, a collar reel 2 is inserted over the hexagonal boss 6 of the disk reel 4 in a such a way that a hexagonal hole made at the center of the collar reel 2 fits over the hexagonal boss 6 of the disk reel 4, and then a cap reel 1 is pressed into the hexagonal hole of the color reel 2 and toward the boss 6 of the disk reel 4. Here, the collar reel 2 is always kept up-lifted by the elasticity of the coil spring 3, capable of moving upward and downward by the guide of the hexagonal boss 6, and rotates in accordance with the disk reel 4.

As illustrated in FIG. 1, in conventional disk reels, jaws 2a are designed to be caught by jaws 7a that are made within the inner diameter of a hub 7 installed in tape case so that the hub, which has taken tape, rotates according to rotation of the collar reel 2. And when the cassette case is settled at the collar reel 2 and the hub 7 is inserted into the reel disk 4, the jaws 2a of the collar 2 and the jaws 7a situated inside the hub 7 are jointed vertically. The jaws 2a of the collar reel 2 and the jaws 7a of the hub 7 may not align properly relative to each other. To be correctly inserted into each other, the collar reel 2 and the coil spring 3 go downward and then the collar reel 2 and the hub 7 are jointed correctly when the jaws 2a of the collar 2 are inserted between the jaws 7a as the collar reel 2 rotates and the elasticity of coil spring 3 pushes the collar reel 2 upward. Then, rotational force of the reel disk 4 can be correctly delivered to the hub 7 of the cassette tape.

In the conventional reel disk, however, the coil spring 3 is inserted over the hexagonal boss 6 and the collar reel 2 is inserted thereon, and then the cap reel 1 is pressed downward to be inserted while the collar reel 2 is being held to prevent the cap reel 1 from being sprung out by the springing force of the coil spring 3, so that the collar reel 2 can be placed correctly.

Accordingly, the conventional reel disk has setbacks that not only assembly work is difficult but also unnecessary cost has to be spent due to relatively large number of parts to be assembled in assembly work.

SUMMARY OF THE INVENTION

It is therefore an object of the present invention to provide a reel disk that is reduced in number of parts than the conventional reel disk and power delivery to the hub 7 can be performed more efficiently by removing the collar reel 2 and the coil spring 3.

BREIF DESCRIPTION OF THE DRAWINGS

For a better understanding of the invention and to show how the same may be carried into effect, reference will now be made, by way of example, to the accompanying diagrammatic drawings, in which:

FIG. 1 is a cross-section view of a reel of prior art;
FIG. 2 is perspective view of a disassembled reel of prior art;
FIG. 3 is a plan view of a hub of prior art;
FIG. 4 is a perspective view of a cap reel according to the present invention;
FIG. 5 is a cross-section view of a reel according to the present invention;
FIG. 6A is a diagram illustrating a state where a cap reel of the present invention and jaws of a hub meet on a straight line;
FIG. 6B is a plane view where the cap reel of the present invention and the jaws 7a of the hub 7 meet on the straight line;
FIG. 7 is cross-section-view of another embodiment of the present invention;
FIG. 8 is a plane view illustrating relationship of a cap reel 105 and a cap 106 of FIG. 7;
FIGS. 9A and 9B are a plane view and a A—A line cross-section view of the cap 106 of another embodiment of the present invention;
FIG. 10A is a plane view of the cap reel 105 of another embodiment of the present invention; and
FIG. 10B is a cross-section view according to B—B line of FIG. 10A. for the cap reel 105, which is united as one body with a reel disk 104, of another embodiment of the present invention.

DETAILED DESCRIPTION OF THE INVENTION

Figure 1:
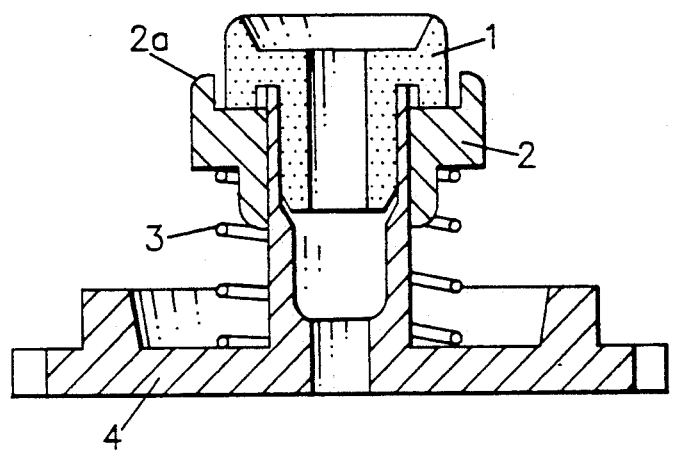
Figure 3:
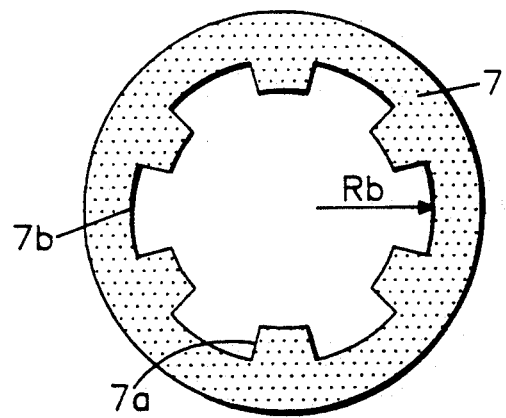
Figure 2:
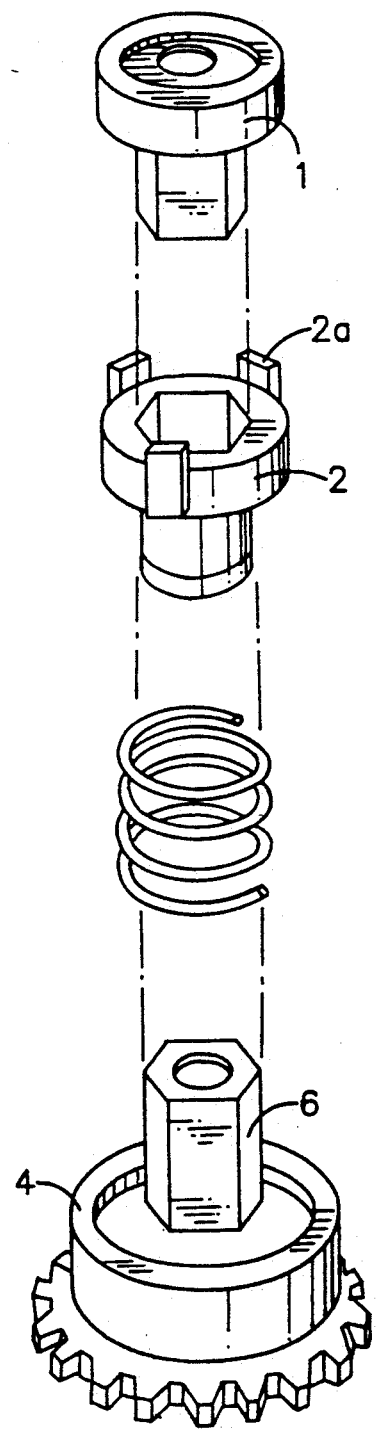
Figure 4:
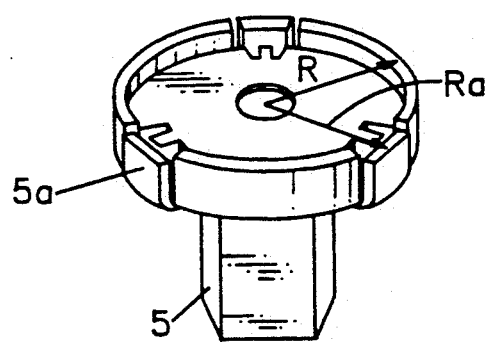
Figure 5:
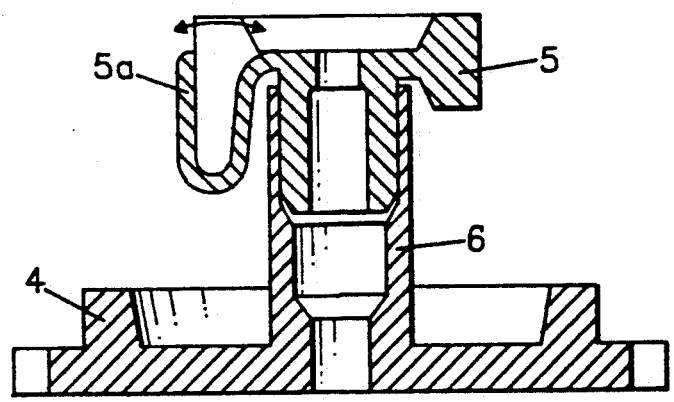
Figure 6A:
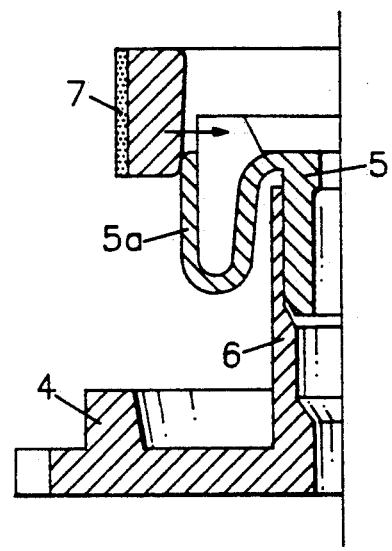

Referring now more descriptively to the attached drawings, three areas of circumference of a cap reel 5, which is inserted into an upper part of a boss 6 of a reel disk 4, are extended outward to form elastic locking pieces 5a as illustrated in FIGS. 4,5 and 6A.

The elastic locking pieces 5a are formed in such a way that three areas of the circumference of the cap reel 5 are cut from rest of the circumference of the cap reel 5, bent downward from the bottom surface of the cap reel 5 and then bent again to the upward direction to form the elastic locking pieces 5a having a radius Ra, which is larger than a radius R of the cap reel 5 but is smaller than a radius Rb of a hub 7 of a cassette tape case, so that elasticity of elastic locking pieces 5a can be exerted as illustrated by an arrow in FIG. 5.

Figure 6B:
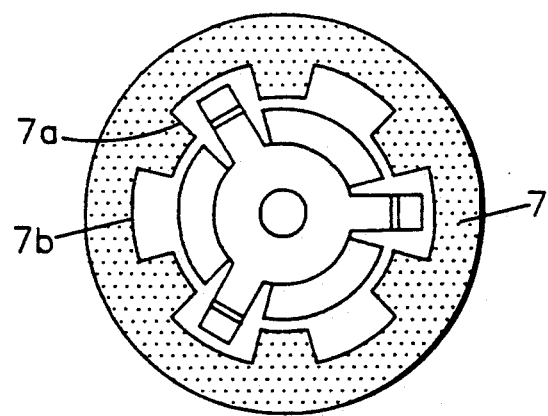

In the present invention as described in the foregoing, when the hub 7 of the cassette tape is guided by the circumference of the cap reel 5 for jointing, the elastic locking pieces 5a are pushed inward as indicated by the arrow in FIG. 5 by downward pushing force of the hub 7 if slots 7b of the jaws 7a of the hub 7, which are illustrated in FIG. 6b, faces as shown in FIG. 6b blocking correct insertion into the hub 7. That is, the elastic locking pieces 5a are put into a contracted state. And when the reel disk 4 rotates in said state, the elastic locking pieces 5a of the cap reel 5 are moved to the position of slots 7b in-between the jaws 7a of the hub 7 so that the elastic locking pieces 5a of the cap reel 5 can be recovered back to original position by the elastic force thereof and contact the sides of the jaws 7a of the hub 7, thereby rotational force of the reel disk is delivered to the hub 7.

Figure 7:
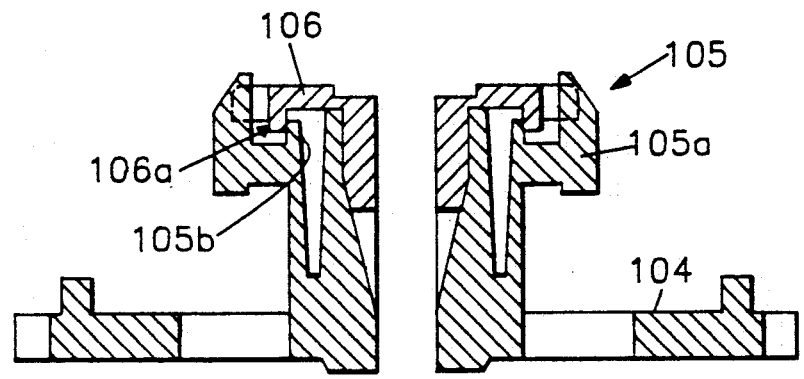
Figure 8:
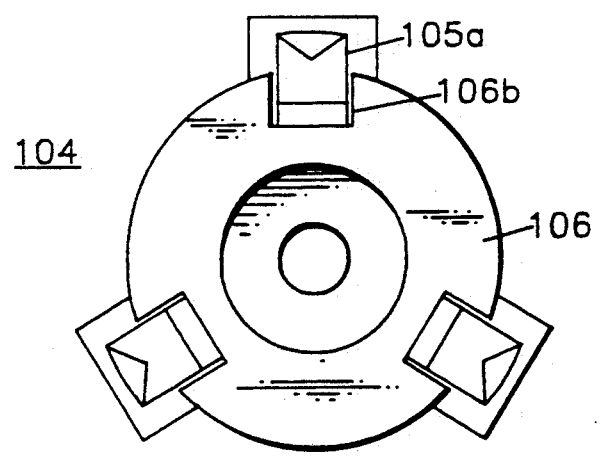
Figure 9A:
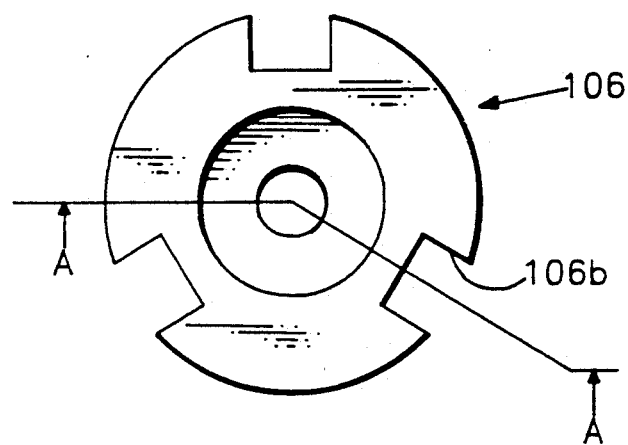
Figure 9B:
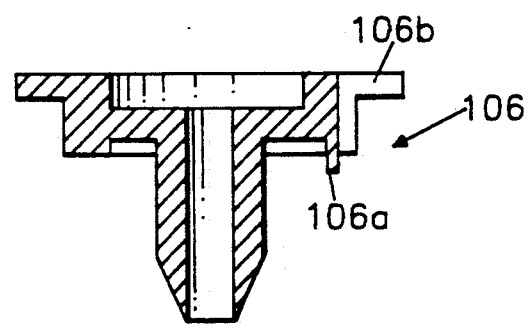
Figure 10A:
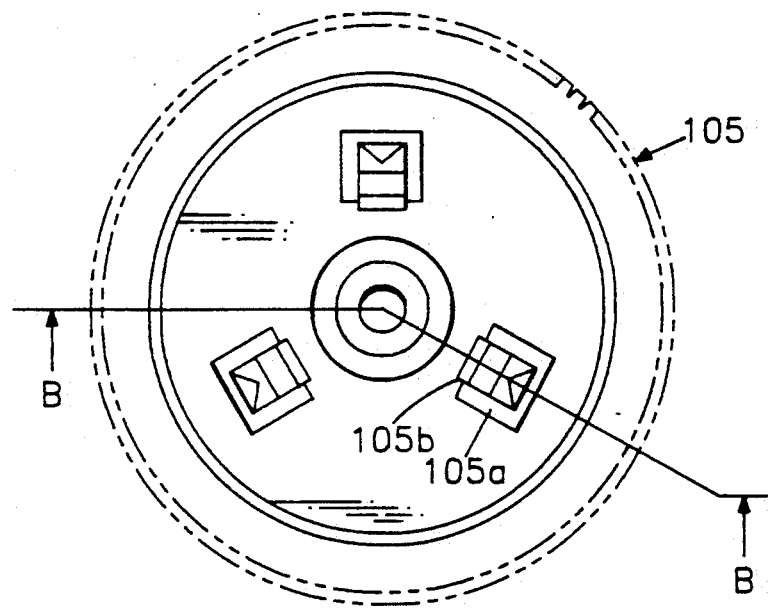
Figure 10B:
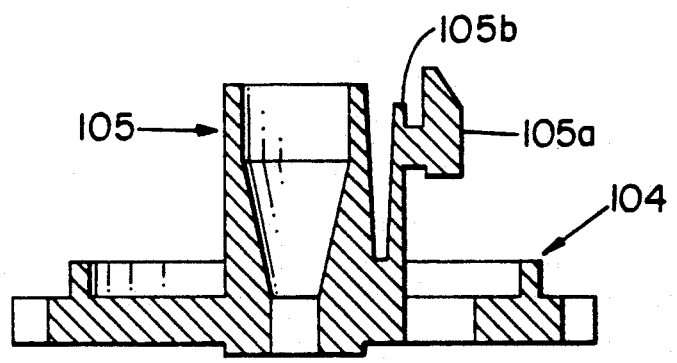

Hereinafter, another embodiment of the present invention will be given with reference to FIGS. 7-10B. This embodiment includes a reel cap 105 which is united as one body with a reel disk 104 as shown in FIG. 10B, a cap 106 as illustrated in FIGS. 9A and 9B. And the cap 106 is so designed as to fit into the cap reel 105 as illustrated in FIG. 7. The cap reel 105, capable of playing the role of the conventional cap reel 5 is so designed as to be united as one body with the reel disk as illustrated in FIG. 10B so that number of parts for assembly can be reduced. In this embodiment, the cap reel 105 has jaws 105b that are formed around the inner diameter of the cap reel 105 and elastic locking pieces 105a of which ends are triangle-shape and raised upward and which are formed around the outer diameter of the cap reel 105, and these elastic locking pieces 105a are situated at three places in the circumference with 120 degrees from each other and having slots that have a selected distance from the center of the cap reel 105. And as shown in FIG. 7, the cap 106 is to push the jaws 105b of the cap reel 105 toward the inner diameter. That is buckles 106a of the cap 106 squeeze the jaws 105b, which are in the inner diameter, of the cap reel. Here, as illustrated in FIG. 9A, the cap 106 has the three slots 106b, so that elastic locking pieces 105a are inserted and firmly supported when the cap 106 is pressed down to be inserted into the cap reel 105 as illustrated in FIG. 8.

Thus, when the cassette tape is inserted into the elastic locking pieces 105a of the cap reel 105, the buckles 106a becomes movable to the inner diameter of the cap reel 105 by elasticity force so that the elastic locking pieces 105a are correctly inserted into the hub 7 of the cassette. And when power is applied, the reel disk 104 and the cap reel that is united as one body with the reel disk 104 are rotated, thereby the hub 7 of the cassette tape that is jointed with the elastic locking pieces 105a of the cap reel 105 rotates by rotation of the elastic locking pieces 105a of the cap reel 105.

As described in the foregoing, the present invention has advantages that number of parts are reduced so that assembly work for parts is improved and cost reduction is achieved by removing the coil spring 3 and the collar reel 2, which have to be included in the prior art.

What is claimed is:

1. A reel disk device for a cassette comprising:

a unitary structure of a reel disk and a reel cap, said reel cap extending generally orthogonal to the reel disk and including a radially inner cylindrical portion and a plurality of circumferentially spaced elastic locking pieces disposed radially outwardly of said cylindrical portion, each said elastic locking piece being cantilevered from said reel disk, and with the free end of each said elastic locking piece including a radially inner locking jaw portion and a radially outer portion defining a locking member for engaging the hub of the cassette; and a cap including a cylindrical portion and a radially outwardly extending annular flange portion disposed at one end of said cylindrical portion; said annular flange portion including at least one axial projection and a plurality of slots in the radially outer circumference thereof corresponding to the number of elastic locking pieces of said reel cap; with each slot receiving a respective elastic locking piece; said cylindrical portion of the cap being received in an interference fit within the radially inner cylindrical portion of said reel cap such that said at least one axial projection of said radially outwardly extending flange portion engages the locking jaw portions of said elastic locking pieces for limiting the radially outward movement of said elastic locking pieces.

2. A reel disk device for a cassette as in claim 1, wherein each locking member of said elastic locking piece is generally beveled for facilitating mounting of said cassette on said reel disk device.

3. A reel disk device for a cassette as in claim 1, wherein said reel cap includes three elastic locking pieces equally spaced about the circumference of said reel cap.

* * * * *